Figure 1:
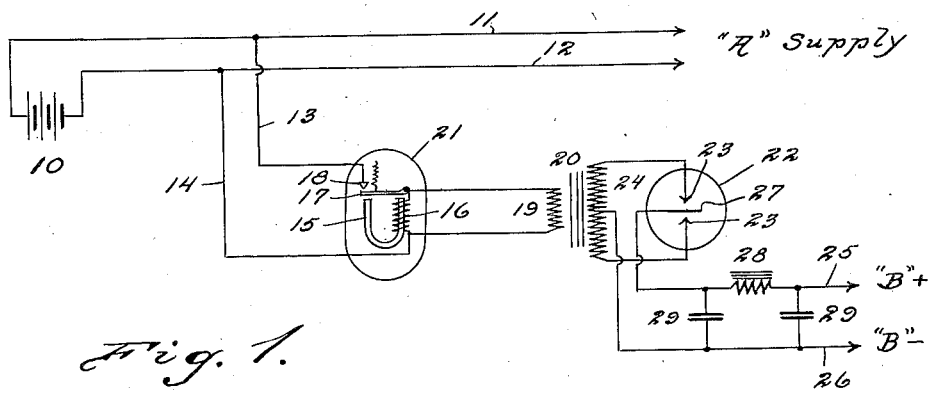

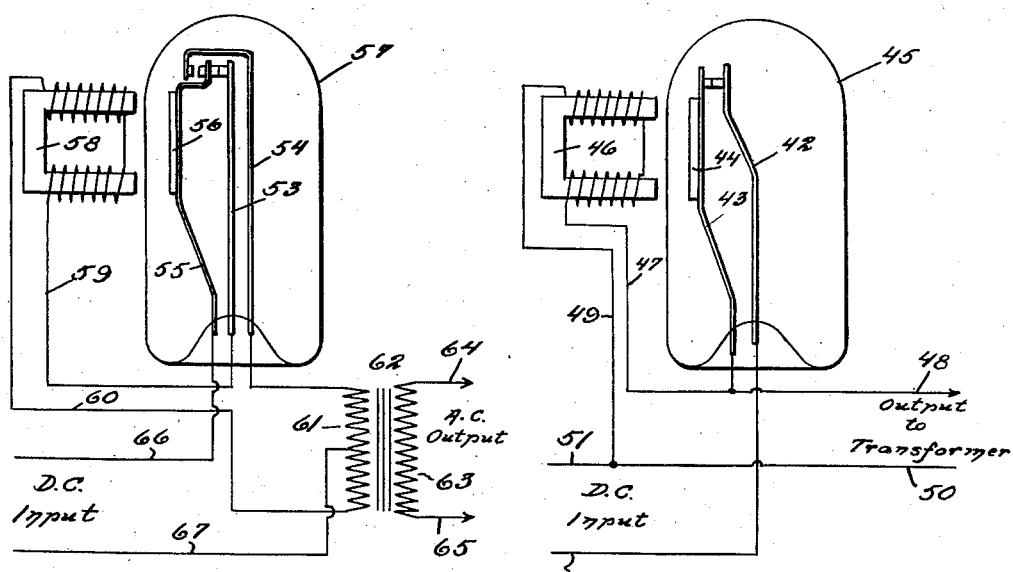
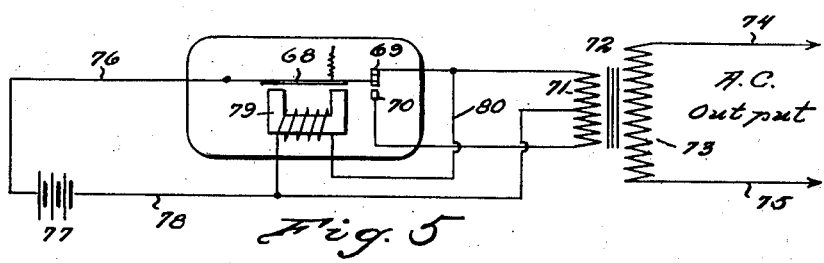
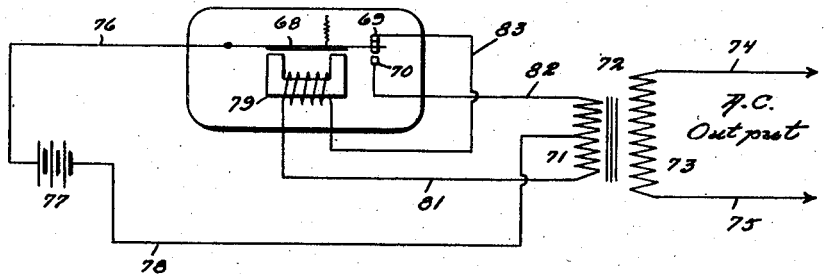

Patented Oct. 17, 1939

2,176,447

UNITED STATES PATENT OFFICE 2,176,447

CURRENT SUPPLY SYSTEM FOR RADIO RECEIVERS

Benjamin Vilkomerson, New York, N. Y., assignor to Radio Corporation of America, New York, N. Y., a corporation of Delaware Application November 19, 1931, Serial No. 576,134

2 Claims. (Cl. 250—27)

The invention relates to systems for the conversion of electric currents and has for its general object the provision of novel means for utilizing low voltage direct currents as power supply for radio receivers, either by converting the low voltage direct currents to equal or higher voltage alternating currents suitable for operating standard alternating current radio receivers, or by providing branch circuits by which the cathodes of the tubes are supplied by one branch of the low voltage direct current, while another branch supplies an electro-magnetic interrupter used in conjunction with a step-up transformer, the high voltage alternating output of the latter being rectified and filtered, so as to be suitable as high voltage direct current supply for the anodes of the tubes.

It is well known that modern radio receiving apparatus requires two current supplies: a source of low voltage direct or alternating current for heating the filaments or cathodes of the tubes, and a source of high voltage direct current for supplying the plates or anodes. In the standard electric receiving sets made for 110 volt A. C. supply, this is done by an alternating current transformer having several secondaries, some of which step down the voltage to that required by the cathodes, and others stepping up the voltage to such a value that, after rectification, it is suitable for supplying the anodes of the tubes.

One hundred ten volt alternating current is not available everywhere. In automobiles, where a six volt storage battery is provided, or in farm lighting systems, where a thirty-two volt direct current is generated, it has been the regular practice to use the low voltage D. C. source for the cathode heating supply only, and to use separate, high voltage "B" batteries to supply the anodes. The purpose of the methods here shown is to eliminate the necessity of providing this separate high voltage battery for anode supply, by either:

(a) Devices or methods for producing a high voltage direct current for anode supply from a low voltage D. C. supply, so arranged that the one source of low voltage D. C. can supply both the cathodes and the anodes;

(b) Devices or methods for operating standard 110 volt A. C. radio receivers from low voltage D. C. supplies, especially applicable to 32 or 110 volt D. C. supplies.

A more specific object is to provide a current changing apparatus embodying a transformer and means for supplying thereto a pulsating current, the input derived for example from a low voltage storage battery being interrupted by means of an electro-magnetic interrupter, preferably located in an evacuated container, so as to minimize noise and oxidation of contacts.

Still another object is to provide an apparatus of this character which will be simple and inexpensive, easy to adjust and control, positive in action, efficient in service, and a general improvement in the art.

Figure 2:
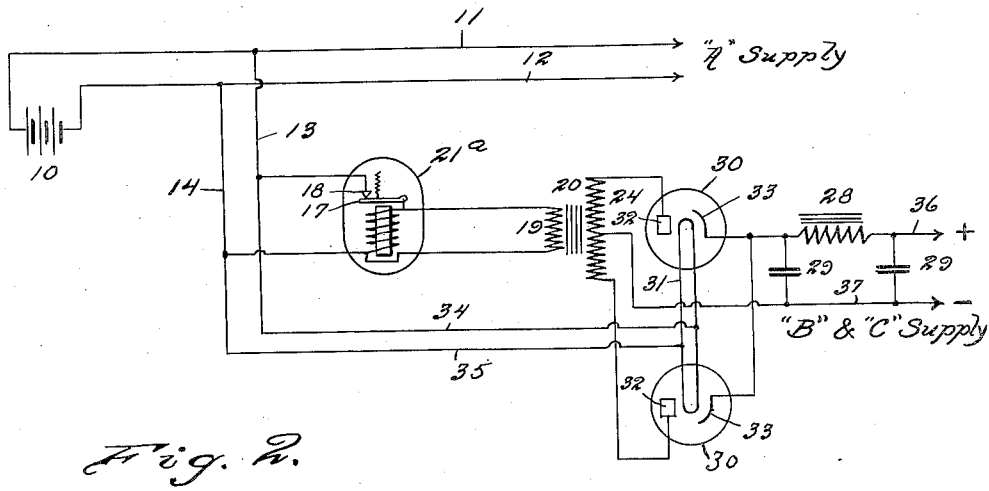
Figure 3:
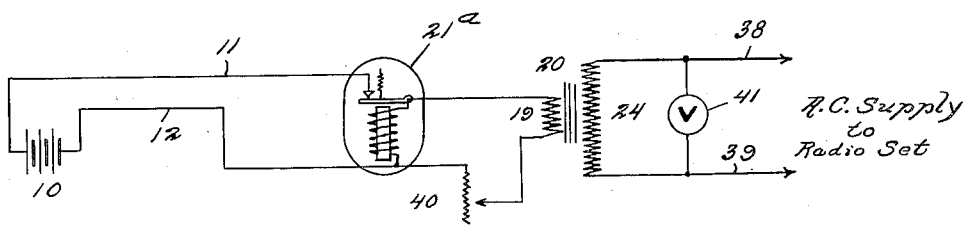
Figure 7:
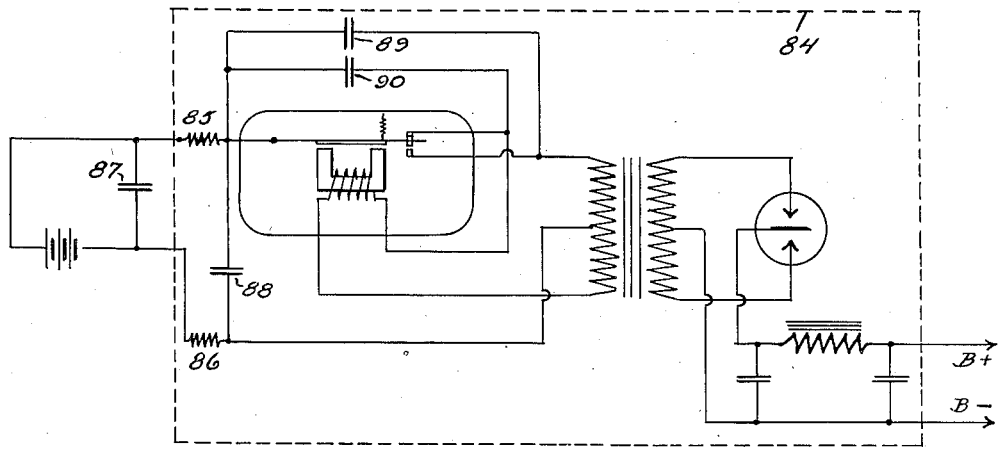
Figure 8:
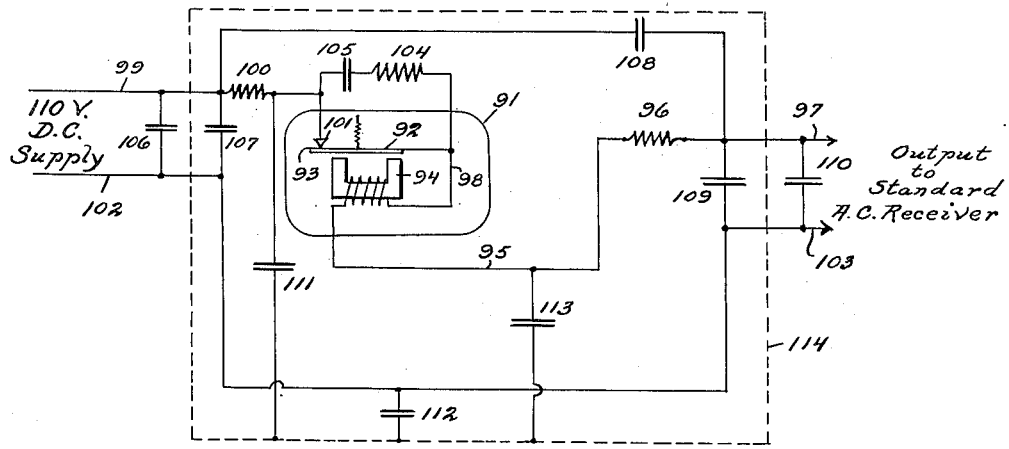
Figure 9:
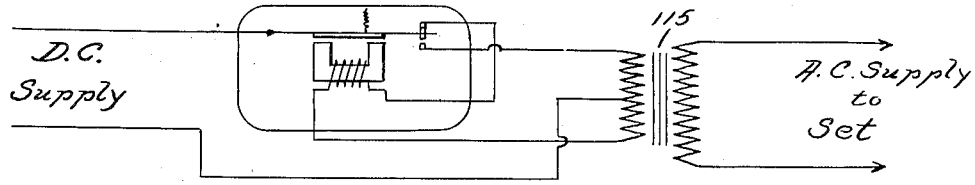

To the attainment of the foregoing and other objects and advantages, the invention preferably consists in the details of construction and the arrangement and combination of parts to be hereinafter more fully described and claimed, and illustrated in the accompanying drawings in which:

Figure 1 is a diagrammatic view showing one embodiment of the invention,

Figure 2 is a similar view showing a modification utilizing somewhat different apparatus, Figure 3 is a diagram showing a form in which the entire output is A. C., Figure 4a is a somewhat diagrammatic elevation of a specially constructed interrupter in which only the contacts are in vacuo, this view showing a single acting device, Figure 4b is a view similar to Figure 4a but showing a double acting type of interrupter, Figure 5 is a diagrammatic view showing an alternative arrangement of the primary and interrupter circuits for reversing the direction of the magnetic flux at each half cycle, which can be used with any of the arrangements disclosed, Figure 6 is a diagrammatic view disclosing an alternative method of all arrangements and which puts the electro-magnet of the interrupter in series instead of in parallel with the primary or part of the primary of the power transformer, Figure 7 is a diagrammatic view showing a typical arrangement using the primary circuit of Figure 6 and disclosing shielding and suppressing means for eliminating the electrical disturbance to the receiver caused by sparking at the contacts of the interrupter, in accordance with standard radio practice for eliminating such disturbances, Figure 8 is a diagram showing a simple and inexpensive arrangement whereby a 110 volt A. C. receiving set can be operated from a 110 volt D. C., this view also showing the type of interference suppressing devices used, Figure 9 shows a somewhat different but possibly more efficient method of operating a 110 volt A. C. set from D. C. of 110 volts, 32 volts or any other voltage, the shielding and disturbance suppressing means being omitted for the sake of clearness.

Referring more particularly to the drawings and especially Figure 1, the numeral 10 designates a current supply source which may be a storage battery possibly of the six volt type used in automobiles or for example the thirty-two volt type commonly used in farm lighting systems. Connected with the terminals of this battery are conductors 11 and 12 to which are connected branch conductors 13 and 14 connected with an electromagnetic interrupter shown as comprising a horseshoe magnet core 15 provided with a coil 16 and adapted to attract an armature 17 cooperating with a contact 18. The conductor 13 is connected with the contact 18 while the conductor 14 is connected with one terminal of the coil 16 and with one terminal of the primary 19 of a transformer 20 of any ordinary or preferred type. The other terminal of this primary is connected with the armature 17 and with the remaining terminal of the coil 16. To eliminate or at least greatly reduce noise this electromagnetic interrupter is preferably enclosed within an evacuated envelope or container 21. The apparatus further includes a rectifier 22 preferably of the gaseous type which has two of its elements 23 connected with the terminals of the secondary 24 of the transformer 20. The output leads 25 and 26 are connected respectively with the remaining element 27 of the rectifier and the center point of the secondary 24. The output current though direct should be smoothed out and I have consequently shown a choke 28 interposed in the lead 25, and a pair of condensers 29 connected across the leads 25 and 26.

Current from the battery 10 may be taken off directly by means of the leads 11 and 12 and used in its unaltered state for any desired purpose. Moreover current passing through the interrupter will be caused to pulsate and as these pulsations pass through the primary 19 of the transformer 20 an alternating current of higher voltage will be induced in the secondary 24 and will be rectified by means of the rectifier 22 and smoothed out by the choke and condensers so as to be capable of employment for example as the "B" current of a radio receiver which has its "A" supply taken directly from the leads 11 and 12.

In Figure 2 I have shown a modification wherein the interrupter 21ª, corresponding to the interrupter 21, is disclosed as of the straight core type instead of the horseshoe variety though it operates in the same manner. In this instance I make use of a pair of rectifiers 30 of the type embodying a filament 31, a plate 32 and an electron emitting cathode 33. The plates of the two tubes are connected with the opposite terminals of the secondary 24 of the transformer, the filaments are connected by conductors 34 and 35 with the battery 10, and the cathodes 33 are connected with each other and with an output lead 36. The other output lead 37 is connected with the center point of the secondary 24. A choke 28 and condensers 29 are provided in the output exactly as described in connection with Figure 1.

This form operates in exactly the same manner as the first described form, the only difference being in the selection of specific apparatus. In both of these instances it is quite apparent that an ordinary or battery type of radio set may be properly energized without any necessity for employing the usual B batteries as by means of the proper transformer any desired voltage may be obtained in the output from the rectifiers.

In case it is desired to energize a radio receiver or other apparatus using alternating current and where there is no necessity for providing any direct current, the arrangement may be as disclosed in Figure 3 wherein the output leads 38 and 39 are connected directly with the terminals of the secondary 24 of the transformer. Preferably the primary 19 which is of course connected with the interrupter exactly as described in connection with Figures 1 and 2 may have interposed in its circuit a variable resistance 40 so that the voltage in the output from the transformer may be regulated. By the simple expedient of providing an alternating current meter 41 across the output leads 38 and 39 the operator may be enabled to make this resistance adjustment properly.

This third mentioned embodiment of the invention is particularly well adapted for use in connection with the operation of a modern type radio receiver energized by ordinary house lighting current. In farm districts or other places where a low voltage direct current is available it is possible with the apparatus shown in Figure 3 to step up the voltage and convert the current from direct to alternating. In addition this particular scheme is advantageous for use in operating an alternating current type of radio receiver from the storage battery of an automobile, motor boat or the like.

In Figures 1 to 3 the interrupter is shown as entirely enclosed within an evacuated shell. The reason is partly to eliminate or at least reduce noise and partly to prevent oxidation of the contacts when the inevitable sparking occurs. However, it is not necessary that the entire interrupter be enclosed and in Figures 4a and 4b I have illustrated interrupters of special construction.

In Figure 4a I have disclosed a stationary contact arm 42 with which cooperates a vibratory contact arm 43 carrying an armature 44, these elements being enclosed within an evacuated shell or tube 45. Located exteriorly of the tube is an electromagnet 46 positioned to attract the armature 44 and consequently make and break the circuit between the contacts. This type of interrupter may be used in either of the above described forms of the invention, and in connection with another form yet to be described, or possibly still other variations, and in this instance the winding of the magnet 46 is represented as having one terminal connected by a conductor 47 with the movable contact arm 43 and with one of the output leads 48, the other terminal of the conductor winding being connected by a magnet 49 with the other output lead 50 which is also connected with the D. C. input lead 51. The other D. C. input lead 52 connects directly with the stationary contact arm 42.

In Figure 4b I have disclosed a pair of stationary contact arms 53 and 54 between which operates a vibratory contact arm 55 carrying an armature 56, all of these elements being enclosed within an evacuated shell or tube 57. Located exteriorly of the tube in position to attract the armature 56 and consequently make and break the circuit between the vibratory contact arm and the stationary contact arms at the two halves of the cycle, is an electro-magnet 58 having one terminal of its winding connected by a conductor 59 with the stationary contact 53 and having its other terminal connected by a conductor 60 with the primary 61 of a transformer 62, the secondary 63 of which has connected therewith output leads 64 and 65. One D. C. input lead 66 connects with the vibratory contact arm 55 while the other D. C. input lead 67 connects with the middle point of the primary 61. These specific connections are merely suggestive as it is conceivable that there may be variations therein.

The interrupters shown in Figures 4a and 4b may be used in various hook-ups and the advantage is that the enclosing of the contacts within an evacuated container practically eliminates noise and also prevents or at least reduces oxidation of the contacts.

Figure 5 discloses an alternative arrangement of the primary and interrupter circuits which can be used with any of the above described arrangements. Referring to this figure in detail I have illustrated an interrupter embodying a vibratory contact 68 operating between stationary contacts 69 and 70 connected with the terminals of the primary 71 of a transformer 72 having its secondary 73 provided with A. C. output leads 74 and 75. The vibratory contact 68 is connected by a conductor 76 with one pole of a storage battery 77 or the like which has its other pole connected by a conductor 78 with one terminal of the winding of an electro-magnet 79 positioned to attract an armature on the vibratory contact. The conductor 78 also connects with the center point of the primary 71. The other terminal of the magnet winding is connected by a conductor 80 with the stationary contact 69. This arrangement is more efficient in some respects than those above described inasmuch as the interrupter is of the double acting type such as that disclosed in Figure 4b. It will be observed that the electromagnet is in parallel with the primary or part of the primary of the transformer.

In Figure 6 the arrangement is quite similar except that one terminal of the electro-magnet is connected by a conductor 81 with one terminal of the primary of the transformer, the other terminal of which is connected by a conductor 82 with the stationary contact 70. The stationary contact 69 is connected by a conductor 83 with the other terminal of the magnet winding. The only difference between this form and what is shown in Figure 5 is that the magnet winding is in series with the primary of the transformer instead of in parallel therewith.

In Figure 7 I have illustrated a complete arrangement embodying the primary circuit of Figure 6 and the output circuit of Figure 1. However, I have additionally shown shielding means 84 enclosing the apparatus and have shown radio frequency chokes 85 and 86 interposed in the leads from the battery to the interrupter and transformer primary, respectively. In addition I have shown radio frequency by-pass condensers 87 and 88 connected across the battery leads at opposite sides of the chokes 85 and 86. Moreover there are preferably other similar condensers 89 and 90 which are connected respectively between one battery lead and each stationary contact of the interrupter.

The arrangement illustrated in Figure 8 constitutes a simple method of utilizing 110 volt D. C. for operating a standard 110 volt A. C. set. In this instance I have shown the use of an interrupter 91 which may be of the single acting type shown in Figure 4a and including a vibratory contact 92 carrying an armature 93 positioned to be attracted by an electro-magnet 94 which has one terminal connected by a conductor 95 to a R. F. choke 96 from which extends an A. C. output lead 97. The other terminal of the magnet winding is connected by a conductor 98 with the vibratory contact 92. One D. C. lead 99 connects through a R. F. choke 100 with the stationary contact 101 of the interrupter while the other D. C. lead 102 connects with the A. C. output lead 103. A resistor 104 and condenser 105 are connected in series with each other across the vibratory contact 92 and stationary contact 101. R. F. by-pass condensers 106 and 107 are connected across the D. C. leads, another condenser 108 is connected between the D. C. lead 99 and output lead 97, still others 109 and 110 are connected across the output leads 97 and 103 and still others 111, 112 and 113 are connected between the shielding 114 and the input lead 99, input lead 102 and conductor 95, respectively.

In Figure 9 there is illustrated the fundamental circuit arrangement, with the shielding and suppressing means omitted, for operating an A. C. set from D. C. of 32, 110, or any other number of volts. This circuit is in all substantial respects the same as that disclosed in Figure 6 except that no battery is indicated as the D. C. supply need not necessarily be from a battery. In this instance the transformer 115 corresponding to the power transformers in all of the other forms must be of proper ratio to give the desired A. C. output in accordance with the D. C. input, it being quite clear that the ratio of the windings would necessarily vary depending entirely upon the input voltage.

In all forms of the invention it will be apparent that I have provided means for stepping up the voltage of a current derived from a low voltage source, such as a storage battery, and producing an alternating current of a desired voltage and which may be used in its unaltered form for the energization of electrical apparatus or which may then be rectified and filtered in case the apparatus, or any part thereof to be energized, requires a direct current. While the invention is capable of employment for a wide variety of purposes which will readily suggest themselves it is particularly useful for operating radio receivers of the A. C. type in localities or under circumstances where the usual alternating lighting current is not available. It is believed from the foregoing that the construction, operation and advantages will be readily apparent to one skilled in the art without further explanation.

While I have shown and described several embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A power supply for a radio receiver, comprising a storage battery, an output transformer having a mid-tapped primary and a secondary, an interrupter including an electro-magnet having a coil, further including a movable armature carrying a contact and additionally including a pair of spaced stationary contacts, one terminal of the storage battery being connected to said armature, the other terminal of the storage battery being connected to the mid-tap of the transformer primary, one terminal of said primary being connected to one of said stationary contacts, the other stationary contact being connected to one terminal of the magnet coil and the other terminal of the magnet coil being connected to the remaining terminal of the transformer, a condenser shunted across the terminals of the storage battery, radio frequency choke coils interposed in the connections to the battery terminals, a condenser shunted between one battery lead and one stationary contact, a second condenser shunted between the same battery lead and the other stationary contact, and a condenser shunted across both choke coils.

2. A power supply for a radio receiver, comprising a direct current supply having one lead adapted for connection with one power input terminal of the receiver, an interrupter including an electro-magnet having a coil and a movable armature cooperating with a stationary contact, the other lead of the direct current supply being connected through a radio frequency choke with said stationary contact and through a condenser and choke with said armature and one terminal of the coil, the other terminal of said coil being connected through a radio frequency choke with the other input terminal of the receiver, a condenser shunted across said input terminals, a condenser connected across the second named direct current supply lead and the second named input lead to the receiver.

BENJAMIN VILKOMERSON.